United States Patent Office 3,470,411
Patented Sept. 30, 1969

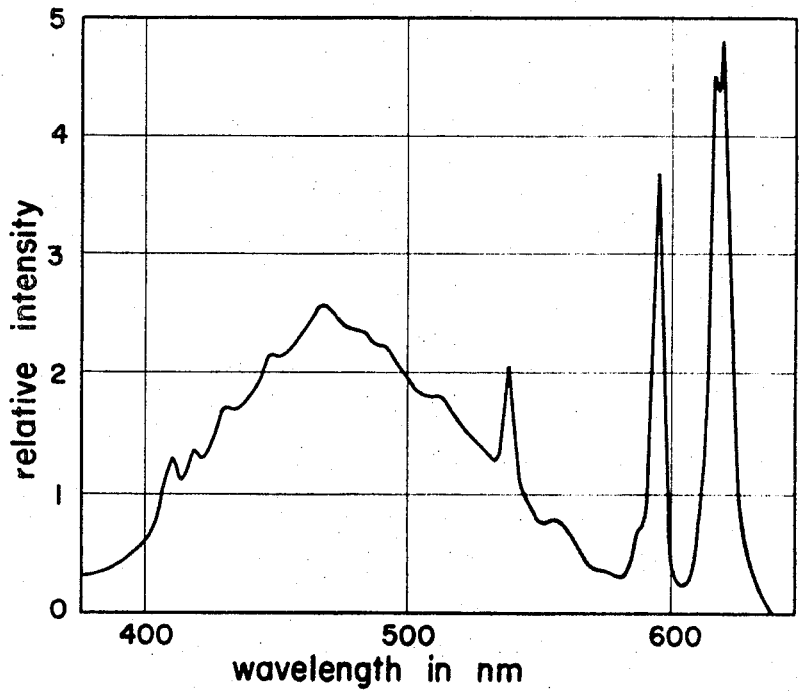
Fig. I
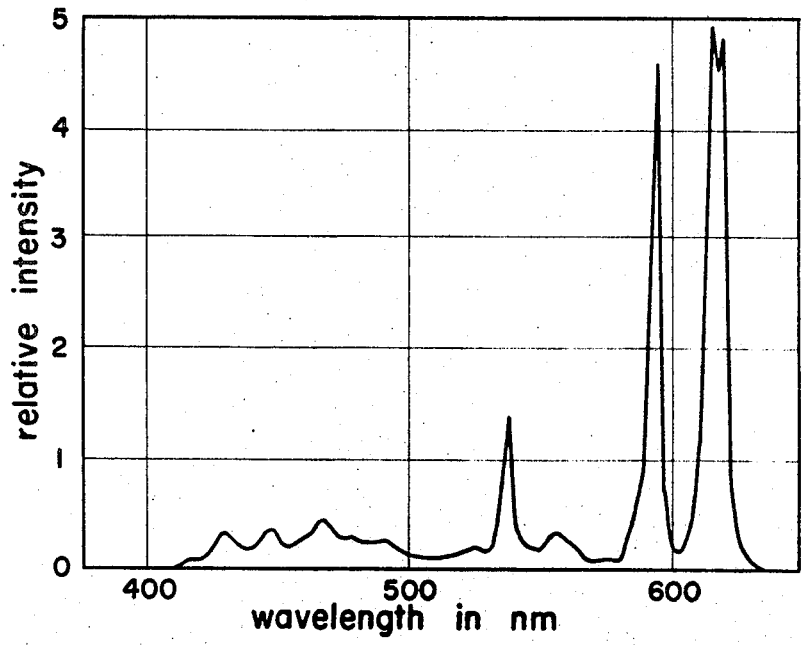
Fig. 2

3,470,411
YTTRIUM-INDIUM VANADATE PHOSPHORS
Lyuji Ozawa, Kamakura-shi, Akio Toshinai, Chigasaki-shi, Yoshihisa Nagashima, Tokyo, and Satoru Nishikawa, Yokosuka-shi, Japan, assignors to Dai Nippon Toryo Kabushiki Kaisha, Konohana-ku, Osaka-shi, Osaka-fu, Japan
Filed Sept. 15, 1966, Ser. No. 579,699
Claims priority, application Japan, Sept. 21, 1965, 40/57,440
Int. Cl. C09k 1/44; H01j 29/20, 61/44
U.S. Cl. 313—92               21 Claims

ABSTRACT OF THE DISCLOSURE

Europium activated yttrium vanadate phosphors having enhanced luminescence are formed by replacing part of the yttrium with indium.

---

Figure 3:
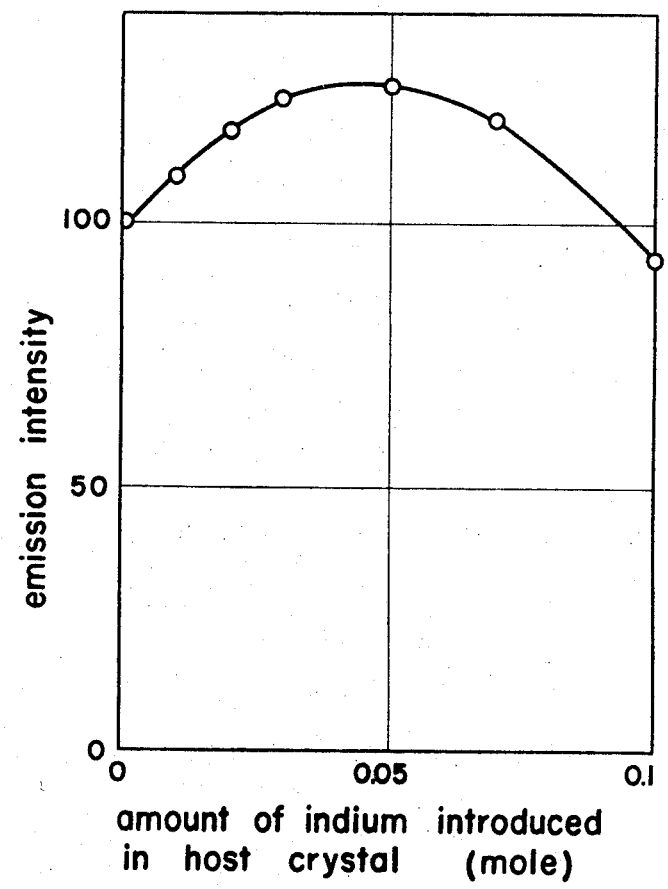

This invention relates to luminescent materials which emit visible radiation upon irradiation with invisible electromagnetic waves such as ultraviolet light or X-rays or with energized material particles such as cathode rays, beta rays or alpha rays and the like. Specifically, the present invention relates to luminescent materials which emit red light upon irradiation with cathode rays or ultraviolet rays radiated from low-pressure or high-pressure mercury discharge lamps. More specifically, the luminescent materials of the invention are yttrium-indium vanadate phosphors activated with trivalent europium.

An object of the present invention is to provide an yttrium-indium vanadate phosphor which readily emits red light in response to cathode rays.

Another object of the invention is to provide an yttrium-indium vanadate phosphor which emit a red emission for color rendering of fluorescent lamps and which responds excellently to ultraviolet light radiated from mercury-arc lamps.

Another object of the invention is to provide an yttrium-indium vanadate phosphor which responds more readily to cathode rays or ultraviolet rays to emit red light with greater brightness than do yttrium vanadate phosphors.

A further object of the invention is to provide red-emitting high brightness phosphors which are less expensive than yttrium vanadate phosphors.

Other objects of the invention will become apparent from the following detailed description.

As stated by L. G. Van Uitert, R. C. Linares, R. R. Soden and A. A. Ballman in the February 1, 1962, issue of the Journal of Chemical Physics, vol. 36, pp. 702–705, a europium-activated yttrium vanadate phosphor is known to have a main emission band at 619 nm. which is attributable to electron transition from the $^5D_0$ level to the $^7F_2$ level of trivalent europium ions. The main emission band at 619 nm. which has a sub-band at 615 nm. attributable to electron transition between the same levels in the trivalent europium ion. It has been disclosed by many workers that the energy levels which are contributory to the luminescence in the trivalent europium ions are well shielded by $5d$ and $6s$ electron shells and are hardly influenced at all by the crystalline field of the host crystals into which the activator ions are introduced, unlike the changeable energy levels of activator ions other than the rare earth element contained in many of the phosphors heretofore known. These elevels are therefore not quite dissimilar to the free ion levels; they are little affected by the crystalline field and merely are an almost linear expanse. It is well known that, for this reason, the band widths of emission caused by the electron transition between those levels in the trivalent europium ions introduced into the host crystals are almost linear.

The electron transition from the $^5D_0$ level to the $^7F_2$ level which gives the main emission band at 619 nm. is attributed to an electronic dipolar transition, and whereas it is forbidden with free ions, the electron transition is allowed when trivalent europium ions are introduced into low symmetry crystals. When the electron transition from the $^5D_0$ level to $^7F_2$ level of trivalent europium ions is allowed, the peak wavelength of the luminescence band will not always be fixed at 619 nm. as a result of the transition but may vary over a wavelength range of 610 to 620 nm. depending upon the structure of the host crystal. For example, when trivalent europium is introduced into an yttrium oxide crystal in a thallium oxide type crystal structure, the luminescence band is at 611.3 nm. When trivalent europium is introduced into a tungstate crystal in a Scheelite structure, the main emission band is at 614 nm. When trivalent europium is introduced into an yttrium vanadate crystal, the main emission band is at 619 nm. The main emission bands given in these examples are invariably caused by the electron transition from the $^5D_0$ level to $^7F_2$ level of the trivalent europium ions. However, the wavelength positions of these main emission bands vary somewhat with the crystal structure, or more particularly with the symmetry of the ions which surround the trivalent europium ions introduced into the host crystal, or in other words, they vary with the difference of the effect of the crystalline field upon the trivalent europium ions introduced into the crystal. The variation is attributed to the fact that, the degeneracy of $^7F_2$ level of the trivalent europium ions is solved by the effect of the crystalline field of the crystal into which the trivalent europium ions are introduced and the $^7F_2$ levels is split up into several levels and thus an electron transition takes place from the $^5D_0$ level, which has no such split levels toward those splitting levels. The most dominant effect of the crystalline field is due to the Stark effect. The probability of electron transition between the $^5D_0$ level and the splitting levels of the $^7F_2$ level is not entirely the same for the $^5D_0$ level with respect to every split level of the $^7F_2$ level. The probability of electron transition from the $^5D_0$ level to the split of the $^7F_2$ level which has the least Stark component is remarkably large as compared with that of the transition to the split level having a large Stark component. The Stark component of each split level of the $^7F_2$, depends upon the structure of the host crystal into which the trivalent europium is introduced. Accordingly, the position of the main emission band is governed solely by the crystal structure into which the trivalent europium ions are introduced, as already stated, even if electron transition occurs from the $^5D_0$ level to the $^7F_2$ level of the trivalent europium ions.

The present invention will now be described in more detail with reference to the accompanying drawings, in which:

FIG. 1 shows a luminescence spectral curve in the wavelength range of 400 to 670 nm. of an yttrium-indium vanadate phosphor according to the invention;

FIG. 2 shows a luminescence spectral curve of an yttrium vanadate phosphor in the same wavelength range as in FIG. 1, the spectra in both FIGS. 1 and 2 not being calibrated in spectral sensitivity by a combination of a spectroscope and a photomultiplier tube; and FIG. 3 shows a curve representing the changes in the intensity of a principal luminescence band at 619 nm. as a result of partial replacement of yttrium in an yttrium vanadate phosphor with indium, expressed as a function of the amount of indium replaced.

Referring to the drawings, the luminescence spectrum of an yttrium vanadate phosphor activated with trivalent europium is as shown in FIG. 2. When an yttrium-indium vanadate crystal in which a portion of the yttrium which is a cationic component constituting the crystal is replaced by trivalent indium ions of the same valence as the yttrium ions, is used as the host crystal, the emission spectrum of the phosphor activated with trivalent europium is as shown in FIG. 1. As will be clear from a comparison of FIGS. 1 and 2, if an yttrium-indium vanadate crystal in which a portion of the yttrium is replaced by indium is used as the host crystal and if trivalent europium is employed as the activator, only the probability of relative electron transition among the split levels from the $^5D_0$ level to the $^7F_2$ level of the trivalent europium ions is slightly varied by the Stark effect.

This is explained by the following: Since a portion of the lattice points occupied by yttrium in the yttrium vanadate crystal are replaced by indium, that is, because a solid solution crystal of yttrium vanadate is formed, a slight difference is produced in the interionic distance among the component ions constituting the crystal as a result of the fact that the indium ions have a slightly smaller ion radius than that of yttrium ions even though the two elements have the same valence. Thus, without any modification of the crystal structure, the effect of the crystalline field alone is slightly changed to bring about a corresponding change in the Stark component on the $^7F_2$ level. Hence there results a change in the relative probability of electron transition between the $^5D_0$ level and the split levels of the $^7F_2$ level.

A phosphor formed of a host crystal of an yttrium vanadate-indium solid solution activated with trivalent europium exhibits a broad luminescence band having a peak at about 470 nm. originated by the indium, in addition to red-light emission based on the trivalent europium. As will be apparent from the foregoing description, indium ions can form a solid solution with an yttrium vanadate crystal, and the luminescence spectrum of a europium-activated phosphor formed of the above solid solution as the host crystal is different from that of an yttrium vanadate phosphor also activated with europium.

The luminous intensity of the 619 nm. emission band resulting from the trivalent europium ions which depends upon the amount of indium ions forming a solid solution with the host crystal varies as shown in FIG. 3. When the yttrium ions in the yttrium vanadate crystal are replaced up to 0.05 mole by the indium ions, the emission intensity at 619 nm. is increased in accordance with the amount of the indium ions which replaces the yttrium ions. If the amount of indium ions used for replacing yttrium exceeds 0.05 mole, the emission intensity at 619 nm. will decrease proportionally with the replacement amount, but if the amount is 0.10 mole, the luminous intensity will be equal to the intensity of luminescence from a phosphor in which no replacement has been accomplished with indium ions.

The yttrium-indium vanadate crystal which is used to form a host crystal in accordance with the invention can be prepared by a solid phase reaction of yttrium vanadate and indium vanadate. Alternatively, it may be prepared by mixing a mixture of oxides of yttrium and indium or a mixture of compounds of these elements which can be readily oxidized on heating, with a vanadium compound such as vanadium oxide or ammonium vanadate which can be readily converted on heating into vanadium oxide, and by heating the entire mixture. In order to make it luminescent, it is important that europium be introduced as an activator into crystals of such a mixture. Europium may be conveniently introduced into the crystal by adding it in the form of europium oxide or a europium compound which can be easily decomposed on heating to europium oxide, either to the materials for the host crystal being compounded or to the host crystal once formed and by heating the whole mixture after a thorough mixing thereof. Whatever the salt chosen, sufficient mixing is essential for a smooth solid phase reaction to be subsequently effected. This purpose is satisfactorily achieved by using a ball mill, roll mill or other suitable mill for the combined operations for milling and mixing the material powders.

To obtain an improved mixing effect, the materials may be mixed by a wet method with the addition of a suitable amount of pure water or organic solvent beforehand to the materials. When a wet method is employed, a thorough mixture of materials prepared as above is dried, packed in a vessel which is not fused at elevated temperatures, for example a quartz or alumina crucible, and is heated in air in an electric furnace at a suitable temperature. A phosphor will then result. Although the suitable heating conditions depend on the types of the starting material salts and the amount of the mixture packed in the vessel, the heating temperature ranges from 800° to 1600° C. and the heating period ranges from 0.5 to 10 hours. In the majority of cases, best results are obtained by firing the mixture at 1400° C. for 3 hours.

The heating operation may be repeated several times. It is also not objectionable to include a milling operation with a ball mill or the like between the heating operations. Interposition of such additional milling operation will provide a phosphor composed of fine powder of a relatively uniform particle size. In order for the resulting phosphor to attain an increased brightness as an effect of the introduction of indium, it is desirable that the amount of indium to be contained in the crystal is such that, in the formula $(Y_{1-x}In_x)VO_4$, $x$ is in the range or 0.005 to 0.10, and most preferably in the neighborhood of 0.05. If the value is outside the above range, the introduction of indium will not increase but rather decrease the brightness of the resulting phosphor.

As in the case of yttrium vanadate, the europium which forms the luminescence center of the phosphor can give a bright luminescence when its concentration is in the range of 0.05 to 0.20 gram atom of the element per mole of the host crystal. The optimum concentration is between 0.05 and 0.10 gram atom.

A phosphor produced in the foregoing manner emits red light upon excitation by either cathode rays or ultraviolet rays. It is brighter by about 30 percent than the yttrium vanadate phosphor thus far known, as indicated in FIG. 3. Thus, the phosphor according to the present invention can be used as a red-emitting component of the fluorescent screen on a cathode-ray tube for color television, in place of the conventional silver-activated cadmium-zinc sulfide phosphor and europium-activated yttrium vanadate phosphor. By this replacement, a brighter fluorescent screen will be provided for color television with a luminescence brightness greater than those of ordinary screens, provided that the cathode-ray tube is operated under the same conditions as heretofore.

Further, because the phosphor in accordance with the invention is capable of radiating brightly upon excitation of ultraviolet lights, it can also be used as a red-emitting phosphor for fluorescent lamps of low-pressure or high-pressure mercury-arc lamps. If the phosphor of the invention is employed for this application, fluorescent lamps will be obtained which have improved color-rendering and luminescence efficiency over lamps using the known phosphors.

In the industrial use of the phosphor according to the invention, it is possible to treat the surface of the phosphor either by adsorbing silicon oxide, phosphorus oxide, tungsten oxide, germanium oxide, or other acidic oxide or by coating the surface with a thin film of such an acidic oxide. Such treatment of the phosphor surface is particularly effective where the face plate of a cathode-ray tube for color television is to be coated with a phosphor layer by the application of a photosensitive binder solution, for example a solution prepared by dispersing the phosphor according to the invention in an aqueous solution of polyvinyl alcohol which is rendered photosensitive by ammonium bichromate. When the phosphor is dispersed in the photosensitive binder solution, the phosphor treated on the surface as above described is hardly affected by the reagent added to the photosensitive binder solution. Therefore, an excellent phosphor screen for a cathode-ray tube can be provided which possesses improved photosensitivity and screen brightness.

As described hereinbefore, there are provided yttrium-indium vanadate phosphors whose luminescence brightness, upon excitation with cathode ray or ultraviolet rays, is greater than conventional phosphors by about 30 percent, by replacing a part of the yttrium in an europium-activated yttrium vanadate phosphor with indium at a europium concentration about equal to that of the ordinary yttrium vanadate phosphor. Also, because a part of the yttrium which is expensive and is not available in abundance is replaced by less expensive indium, industrially advantageous phosphors can be provided.

Example 1

A mixture consisting of:

| | Moles |
|---|---|
| Yttrium oxide ($Y_2O_3$) | 0.95 |
| Vanadium pentoxide ($V_2O_5$) | 1.00 |
| Indium oxide ($In_2O_3$) | 0.05 |
| Europium oxide ($Eu_2O_3$) | 0.08 | is thoroughly mixed by a ball mill, packed in an alumina crucible, and heated in air at 1400° C. for 3 hours by an electric furnace. A phosphor will result which emits light upon excitation by cathode rays or ultraviolet lights, with a linear emission spectrum as shown in FIG. 1, and with a brightness about 30% greater than that of an yttrium vanadate phosphor prepared without the addition of indium.

Example 2

A mixture consisting of:

| | Moles |
|---|---|
| Yttrium oxalate ($Y_2(C_2O_4)_3$) | 0.95 |
| Ammonium vanadate ($NH_4VO_3$) | 2.10 |
| Indium oxide ($In_2O_3$) | 0.05 |
| Europium oxalate ($Eu_2(C_2O_4)_3$) | 0.05 | is thoroughly mixed by a ball mill, packed in an alumina crucible, and heated in air at 1200° C. for 5 hours by an electric furnace. A phosphor will result which emits light upon excitation by cathode rays or ultraviolet lights, with a linear emission spectrum as shown in FIG. 1, and with a brightness about 30% greater than that of an yttrium vanadate phosphor prepared without the addition of indium.

Example 3

A mixture consisting of:

| | Moles |
|---|---|
| Yttrium vanadate phosphor ($YVO_4$:Eu) | 0.96 |
| Indium oxide ($In_2O_3$) | 0.02 | is thoroughly mixed by a ball mill, packed in an alumina crucible, and heated in air at 1300° C. for 2 hours by an electric furnace. A phosphor will result which emits light upon excitation by cathode rays or ultraviolet lights, with a linear emission spectrum as shown in FIG. 1, and with a brightness about 30% greater than that of an yttrium vanadate phosphor free from indium.

Example 4

A mixture consisting of:

| | Moles |
|---|---|
| Yttrium oxide ($Y_2O_3$) | 0.97 |
| Ammonium vanadate ($NH_4VO_3$) | 2.00 |
| Indium oxide ($In_2O_3$) | 0.03 |
| Europium nitrate ($Eu(NO_3)_3$) | 0.10 | is thoroughly mixed by a ball mill, packed in a quartz crucible, and heated in air at 1400° C. for one hour by an electric furnace. A phosphor will result which emits light upon excitation by cathode rays or ultraviolet lights, with a linear emission spectrum as shown in FIG. 1, and with a brightness about 30% greater than that of an yttrium vanadate phosphor free from indium.

We claim:

1. An inorganic crystal phosphor comprising a host crystal which is a vanadate crystal containing both yttrium and indium as cationic components, and trivalent europium added thereto as an activator, said indium being present in an amount sufficient to increase the level of the luminescence of the vanadate above the luminescence level for each of the vandates of yttrium and the indium alone.

2. An yttrium-indium vanadate phospher as claimed in claim 1 in which the ions of yttrium and indium which constitute the cationic components of the host crystal are present in a ratio in the range of 91:9 to 99:1.

3. A method of producing the phosphor as claimed in claim 1 which comprises the steps of mixing either the oxides of yttrium, indium, and vanadium which are to be components of the host crystal, or compounds of said elements which can be readily converted by heat into the respective oxides, all in the form of fine powders, adding a fine powder of europium oxide or a europium compound which can be readily oxidized on heating, as an activator, to said mixture, thoroughly mixing same and thereafter baking the mixture at a temperature above 1000° C.

4. A method as claimed in claim 3 wherein the step of baking is repeated several times.

5. A method as claimed in claim 4 further comprising the step of milling the mixture at least once between the repeated baking steps.

6. A phosphor as claimed in claim 1 which is coated with a thin layer of an acidic oxide.

7. A phosphor as claimed in claim 6 wherein the acidic oxide is silicon oxide, phosphorus oxide, tungsten oxide, or germanium oxide.

8. A phosphor screen for a cathode-ray tube for color television in which a phosphor as claimed in claim 1 is employed as a red-emitting phospher component.

9. A fluorescent lamp comprising a phosphor as claimed in claim 1 for the purpose of improving the red-emitting property of a low-pressure or a high-pressure mercury-discharge fluorescent lamp.

10. An yttrium-indium vanadate phosphor as claimed in claim 2 wherein the range is 93:7 to 97:3.

11. A method of producing the phosphor as claimed in claim 2 which comprises the steps of mixing either the oxides of yttrium, indium, and vanadium which are to be components of the host crystal, or compounds of said elements which can be readily converted by the heat into the respective oxides, all in the form of fine powders, adding a fine powder of europium oxide or a europium compound which can be readily oxidized on heating, as an activator, to said mixture, thoroughly mixing same and thereafter baking the mixture at a temperature above 1000° C.

12. A method as claimed in claim 11 wherein the step of baking is repeated several times.

13. A method as claimed in claim 12 further comprising the step of milling the mixture at least once between the repeated baking steps.

14. A phosphor as claimed in claim 2 which is coated with a thin layer of an acidic oxide.

15. A phosphor as claimed in claim 14 wherein the acidic oxide is silicon oxide, phosphorus oxide, tungsten oxide, or germanium oxide.

16. A phosphor screen for a cathode-ray tube for color television in which a phosphor as claimed in claim 2 is employed as a red-emitting phosphor component.

17. A phosphor screen for a cathode-ray tube for color television in which a phosphor as claimed in claim 6 is employed as a red-emitting phosphor component.

18. A phosphor screen for a cathode-ray tube for color television in which a phosphor as claimed in claim 7 is employed as a red-emitting phosphor component.

19. A fluorescent lamp comprising a phosphor as claimed in claim 2 for the purpose of improving the red-emitting property of a low-pressure or a high-pressure mercury-discharge fluorescent lamp.

20. A fluorescent lamp comprising a phosphor as claimed in claim 6 for the purpose of improving the red-emitting property of a low-pressure or a high-pressure mercury-discharge fluorescent lamp.

21. A fluorescent lamp comprising a phosphor as claimed in claim 7 for the purpose of improving the red-emitting property of a low-pressure or a high-pressure mercury-discharge fluorescent lamp.

References Cited

UNITED STATES PATENTS 3,360,674  12/1967  Mikus et al. _____ 252—301.4
3,360,675  12/1967  Mikus et al. _____ 252—301.4

TOBIAS E. LEVOW, Primary Examiner

R. D. EDMONDS, Assistant Examiner

U.S. Cl. X.R.

252—301.4; 313—108